*(12)* United States Patent
Xu et al.

(10) Patent No.: US 10,296,430 B2
(45) Date of Patent: May 21, 2019

(54) MOBILE PHONE WITH SYSTEM FAILURE PREDICTION USING LONG SHORT-TERM MEMORY NEURAL NETWORKS

(71) Applicant: NEC Laboratories America, Inc., Princeton, NJ (US)

(72) Inventors: Jianwu Xu, Lawrenceville, NJ (US); Ke Zhang, Pittsburg, PA (US); Hui Zhang, Princeton Junction, NJ (US); Renqiang Min, Princeton, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 15/478,753

(22) Filed: Apr. 4, 2017

(65) Prior Publication Data

US 2017/0293543 A1 Oct. 12, 2017

Related U.S. Application Data

(60) Provisional application No. 62/318,867, filed on Apr. 6, 2016.

(51) Int. Cl.
*G06F 11/22* (2006.01)
*G06F 11/00* (2006.01)
*G06N 3/08* (2006.01)

(52) U.S. Cl.
CPC ........ *G06F 11/2263* (2013.01); *G06F 11/008* (2013.01); *G06N 3/08* (2013.01)

(58) Field of Classification Search
CPC .. G06F 11/004; G06F 11/008; G06F 11/2263; G06F 2201/81; G06F 2201/83;
(Continued)

(56) References Cited

U.S. PATENT DOCUMENTS 9,934,265 B2 * 4/2018 Karandikar ....... G06F 17/30368
2015/0227838 A1 * 8/2015 Wang .................... G06F 11/008
706/12
(Continued)

FOREIGN PATENT DOCUMENTS

WO WO-2016144586 A1 * 9/2016 ............. G05B 15/02

OTHER PUBLICATIONS

Zhang K, Xu J, Min MR, Jiang G, Pelechrinis K, and Zhang H; "Automated IT System Failure Prediction: A Deep Learning Approach;" In BigData; Dec. 5, 2016; pp. 1291-1300.*

(Continued)

*Primary Examiner* — Joseph R Kudirka
(74) *Attorney, Agent, or Firm* — Joseph Kolodka

(57) ABSTRACT

Mobile phones and methods for mobile phone failure prediction include receiving respective log files from one or more mobile phone components, including at least one user application. The log files have heterogeneous formats. A likelihood of failure of one or more mobile phone components is determined based on the received log files by clustering the plurality of log files according to structural log patterns and determining feature representations of the log files based on the log clusters. A user is alerted to a potential failure if the likelihood of component failure exceeds a first threshold. An automatic system control action is performed if the likelihood of component failure exceeds a second threshold.

14 Claims, 10 Drawing Sheets

(58) Field of Classification Search
CPC . G06F 2201/835; G06F 2201/86; G06N 3/08; G06N 99/005
USPC .......................................................... 714/26
See application file for complete search history.

(56) References Cited

U.S. PATENT DOCUMENTS

| | | | | |
|---|---|---|---|---|
| 2015/0339586 | A1* | 11/2015 | Adjaoute | G06N 3/08 706/52 |
| 2016/0299938 | A1* | 10/2016 | Malhotra | G06F 17/30324 |
| 2016/0359697 | A1* | 12/2016 | Scheib | H04L 63/1425 |
| 2017/0017901 | A1* | 1/2017 | Firooz | G06N 99/005 |
| 2017/0085447 | A1* | 3/2017 | Chen | G06F 17/30554 |
| 2017/0139760 | A1* | 5/2017 | Rahman | G06F 11/079 |

OTHER PUBLICATIONS

Charoenpornwattana K, Leangsuksun C, Tikotekar A, Vallée GR, Scott SL, Chen X, Eckart B, He X, Engelmann C, and Sun XH; "A Neural Networks Approach for Intelligent Fault Prediction in HPC Environments," In HAPCW'08: High Availability and Performance Computing Workshop; 2008.*

U.S. Appl. No. 62/171,899: Specification; filed Jun. 5, 2015; associated with U.S. Patent Application Publication No. US 2016/0359697 A1.*

Alex Graves, Supervised Sequence Labelling with Recurrent Neural Networks, Mar. 2012.

Xia Ning, HLAer: a System for Heterogeneous Log Analysis, SDM Workshop on Heterogeneous Machine Learning, Apr. 2014.

Ruben Sipos, Log-based Predictive Maintenance, The ACM SIGKDD Conference Series, Aug. 24-27, 2014.

TF Smith, Identification of Common Molecular Subsequences, J Mol Biol. Mar. 25, 1981, 195-197.

Risto Vaarandi, A Data Clustering Algorithm for Mining Patterns From Event Logs, Proceedings of the 3rd IEEE Workshop on IP Operations & Management, Oct. 2003.

\* cited by examiner

MOBILE PHONE WITH SYSTEM FAILURE PREDICTION USING LONG SHORT-TERM MEMORY NEURAL NETWORKS

RELATED APPLICATION INFORMATION

This application claims priority to 62/318,867 filed on Apr. 6, 2016, incorporated herein by reference in its entirety. This application is related to an application entitled, "SYSTEM FAILURE PREDICTION USING LONG SHORT-TERM MEMORY NEURAL NETWORKS," which is incorporated by reference herein in its entirety.

BACKGROUND

Technical Field

The present invention relates to information technology management and, more particularly, to the prediction of system failures using neural networks.

Description of the Related Art

Heterogeneous IT operational logs serve as inexpensive "sensors," recording and indicating the health status of enterprise computer systems. Traditional system monitoring relies on manually backtracking those logs, which is both labor-intensive as well as a post hoc approach, i.e., identifying what went wrong after the fact. Service failure prediction becomes increasingly critical in preventing unexpected system downtime and improving the quality of service for end users.

Traditionally, the automation of this process has used text mining to extract relevant text features and patterns for failure prediction. One of the widely used features is the term frequency—inverse document frequency (TF-IDF) feature. However, most text mining techniques based on TF-IDF lead to a high-dimensional feature space and, even more importantly, do not easily generalize to multiple log formats.

SUMMARY

A method for mobile phone failure prediction includes receiving respective log files from one or more mobile phone components, including at least one user application. The log files have heterogeneous formats. A likelihood of failure of one or more mobile phone components is determined based on the received log files by clustering the plurality of log files according to structural log patterns and determining feature representations of the log files based on the log clusters. A user is alerted to a potential failure if the likelihood of component failure exceeds a first threshold. An automatic system control action is performed if the likelihood of component failure exceeds a second threshold.

A method for mobile phone failure prediction includes clustering a plurality of log files from respective mobile phone components, including at least one user application, having heterogeneous log formats according to structural log patterns using unsupervised, hierarchical clustering. Feature representations of the log files are determined based on the log clusters. The feature representations consist of pattern distribution among clustered logs and term frequency—inverse document frequency. A likelihood of a failure of one or more of the mobile phone components is determined based on the feature representations using a long short-term memory neural network a binomial distribution based on an output of the long short-term memory neural network and a binary target vector with two complementary classes. A user is alerted to a potential failure if the likelihood of component failure exceeds a first threshold. An automatic system control action is performed if the likelihood of component failure exceeds a second threshold.

A mobile phone includes a processor and a memory. A pattern learning module is configured to use the processor to cluster a plurality of log files stored in the memory from respective mobile phone components, including at least one user application, according to structural log patterns. A feature extraction module is configured to determine feature representations of the log files based on the log clusters. A failure prediction module is configured to determine a likelihood of a failure of one or more of the mobile phone components based on the feature representations using a neural network. A system control module is configured to perform an automatic system control action if the likelihood of component failure exceeds a threshold.

A mobile phone includes a processor and a memory configured to store respective log files from one or more mobile phone components, including at least one user application. The log files have heterogeneous formats. A pattern learning module is configured to use the processor to cluster the log files according to structural log patterns. A feature extraction module is configured to determine feature representations of the log files based on the log clusters. A failure prediction module is configured to determine a likelihood of a failure of one or more of the mobile phone components based on the feature representations using a neural network. An alert module is configured to alert a user to a potential failure if the likelihood of component failure exceeds a first threshold. A system control module is configured to perform an automatic system control action if the likelihood of component failure exceeds a second threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided automatically provide early warnings for potential system failure prediction by applying deep learning on heterogeneous operational logs. The present embodiments extract generic (e.g., non-textual) features from console logs that pass through a deep long short-term memory (LSTM) recurrent neural network. The LSTM recurrent neural network operates without gradient vanishing during learning.

Features are obtained based on patterns learned from unsupervised learning and are observed among similar logs, both in terms of format and content. Once clusters have been identified, the distribution of the patterns over the clusters form the features. The features are passed to the deep LSTM recurrent neural network to perform failure prediction, capturing the underlying dynamics of the system. The present embodiments thereby provide a predictive system that achieves higher accuracy with a smaller feature set than conventional predictive systems.

Figure 1:
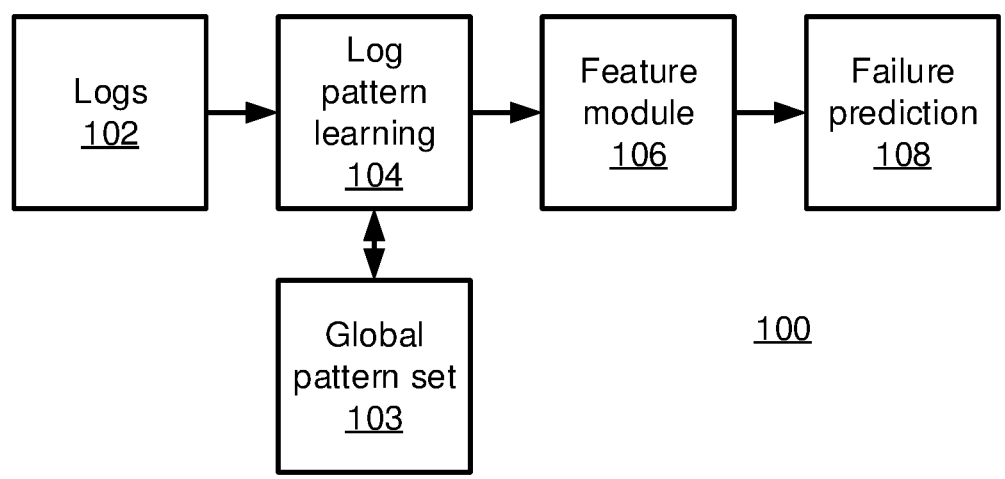
FIG. 1 is a block/flow diagram of a failure prediction system in accordance with an embodiment of the present invention.

Referring now to FIG. 1, a block/flow diagram of a failure prediction system 100 is shown. Given an input log file 102, log pattern learning 104 clusters the logs having similar formats together and extracts log patterns, which are stored in the global pattern set 103. It should be noted that the input log file 102 is "heterogeneous," which is used herein to denote that the logs may be generated by systems that may have been written in different programming languages and with different logging styles, producing logs that have different structures and semantics. The log pattern learning component 104 uses unsupervised learning to automatically produce a pattern set without human input. The global pattern set 103 is periodically updated to capture the latest log patterns.

Log patterns generated by the log pattern learning component 104 are passed to a feature representation module 106. The feature representation module 106 obtains at least two types of features, including a pattern distribution among similar logs and content patterns based on term frequency—inverse document frequency (TF-IDF). These features represent the underling dynamics and characteristics of the system being analyzed.

Failure prediction 108 takes the feature outputs from the feature representation module 106 and performs training for an LSTM neural network, upon which failure prediction 108 bases its predictions of future service failures. An LSTM recurrent neural network is able to achieve high accuracy with a small feature set as contrasted to conventional systems which may use, e.g., hundreds of features.

Figure 2:
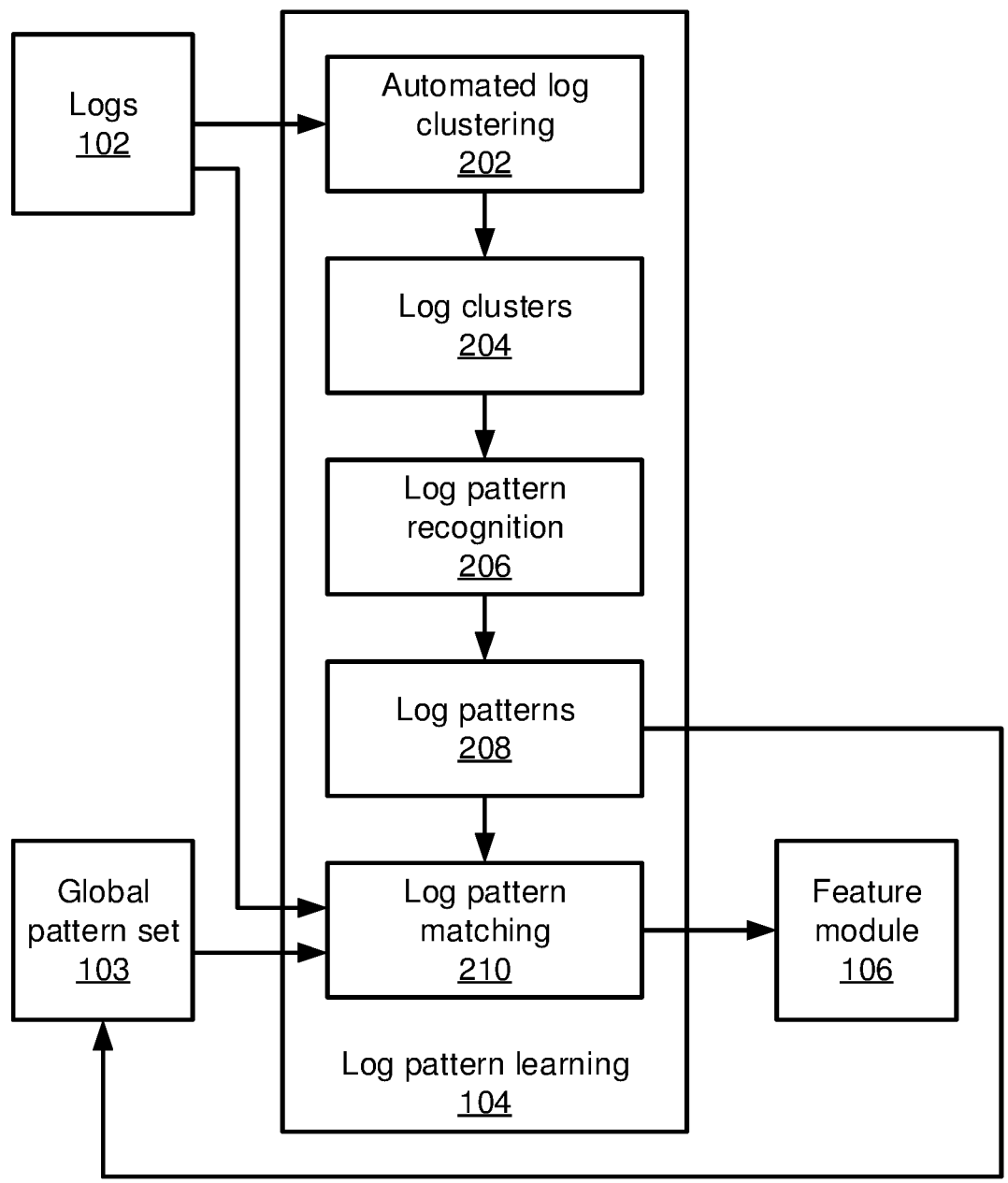
FIG. 2 is a block/flow diagram of log pattern learning in accordance with an embodiment of the present invention.

Referring now to FIG. 2, additional detail is provided regarding log pattern learning 104. As noted above, the present embodiments determine log format patterns based on unsupervised learning. Once the log format patterns are extracted, the input heterogeneous logs 102 are parsed using the global pattern set 103 to produce matched logs. The matched log output is provided to the feature module 106.

Application logs are generally generated from templates that are defined in the source code of the application and, thus, have a pre-defined format. Logs that come from a single source may have the same format and structure. In addition, log records can appear redundantly. This is due to the fact that some log records are sued for housekeeping purposes, with the same log record being repeated many times. The existence of such regulated layouts and redundancy makes log data clustering easier than clustering in other forms of textual data. A regular layout can represent a cluster of similar logs and help reduce redundancy and summarize the meanings of log data.

Whereas conventional systems attempt to backtrack the source code to identify the layout of logged data, this is only possible when the source code is available and is therefore not generalizable to a mixture of heterogeneous logs coming from various applications, written in different programming language, with different logging styles. The present embodiments use pattern learning to capture the log structure and semantics of each field. These patterns serve as a high-level summarization of similar logs that indicate similar behaviors in the system.

Automated log clustering is performed in block 202 and uses log tokenization and unsupervised clustering. The logs are tokenized such that lower-level information from the words or phrases of each log record can be identified and retrieved. However, heterogeneous logs from different applications and systems have different formats and, thus, different tokenizers and delimiters. Without specific domain knowledge or human inspection, there is no guarantee that particular pre-defined tokenizers will accurately tokenize the entire set of heterogeneous log data. As a result, the most general delimiter or set of delimiters should be used. The use of such a delimiter avoids interfering with potential, unknown delimiters from the log data. In one embodiment, empty space (e.g., spaces or newlines) may be used as such a general delimiter. All of the words and special symbols in a log will generally be separated by empty space.

Once the logs are tokenized into individual strings, unsupervised clustering is applied. Without domain knowledge with respect to the log formats, usage, sources, etc., a first step toward understanding and analyzing heterogeneous logs is to understand the geometric structure of the log data. Clustering serves as a way to categorize data purely based on its intrinsic properties and relations. Therefore clustering is applied on the heterogeneous logs to present the initial depiction of the data. In specific, hierarchical clustering is used to generate a hierarchical structure of the heterogeneous logs. Dense regions are searched by expanding from a certain data point toward its neighboring data points. The resulting hierarchical structure represents the data relations among its data points.

Hierarchical clustering is used not only because it can provide a coarse-to-fine view of the data, but also because the following data indexing and search is built up on a hierarchical tree structure for efficiency purposes. The results of automated log clustering in block 202 is written into log clusters 204. Logs having similar syntactic structures will be clustered together, such that logs with similar formats will align along the same pattern.

After clustering the log data, an overall structure of all the heterogeneous logs is generated. However, patterns within each cluster are still needed to semantically understand the logs in-depth. Block 206 performs log pattern recognition to identify which field of a log record, after tokenization, is about which specific information. Since the log records have very similar formats within each cluster due, pattern recognition is performed within a cluster using sequence alignment. All the log records within a cluster are aligned together so as to identify the motifs (the most conserved and frequent common portion), and thus the common patterns, from the logs. Pairwise alignment is performed using, e.g., a Smith-Waterman process and then an Unweighted Pair Group Method with Arithmetic Mean (UPGMA) strategy is used to perform multiple alignments. The results of log pattern recognition 206 may be stored in a regular expression format and may be grouped into a log patterns file 208. The output is used to update the global pattern set 103 and serve as the final model of the input heterogeneous logs 102.

Block 210 performs log pattern matching based on the log patterns 208. The input heterogeneous logs 102 are parsed against the log patterns 208 using, e.g., a general log parsing engine. Given a regular expression format, such a tool parses the input log. Any input log will either be matched to one of the extracted log patterns 208 or will not be matched at all. If a log record is not matched, it is considered an outlier. If a log record is matched, the parsing engine automatically extracts its contents, including the contents of individual fields such as timestamps, etc. The output of the log pattern matching 210 is provided as input to feature module 106.

Figure 3:
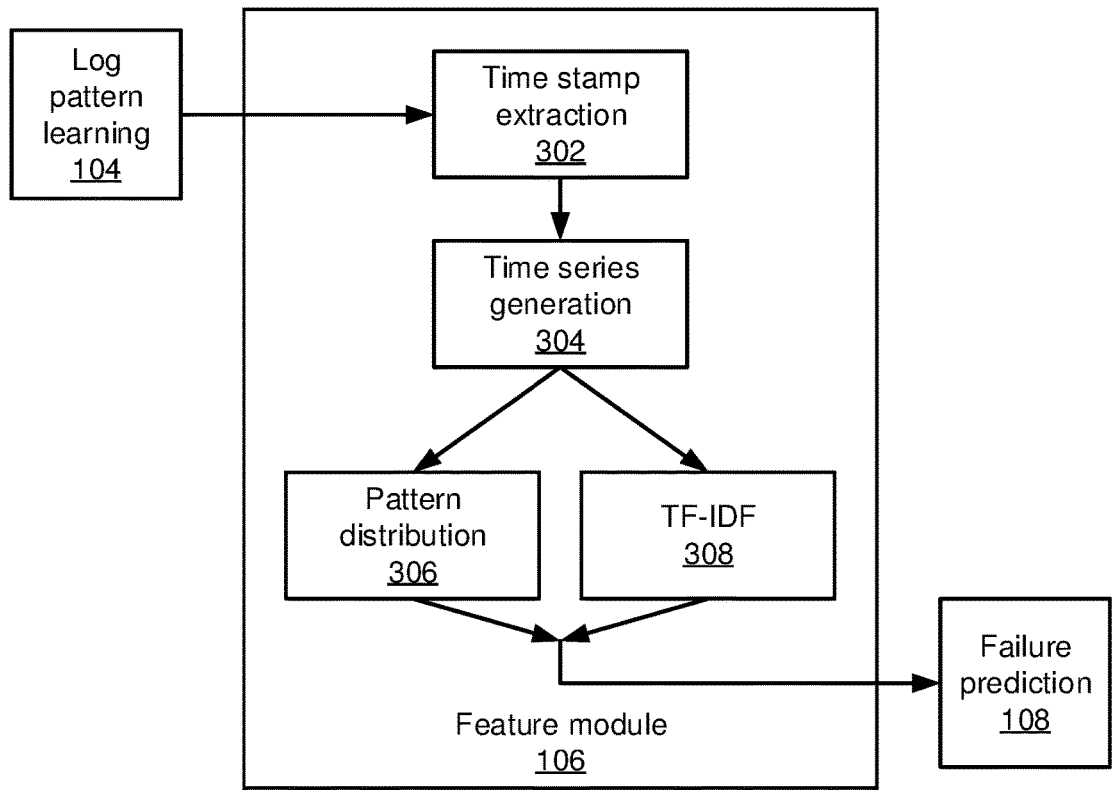
FIG. 3 is a block/flow diagram of a feature representation module in accordance with an embodiment of the present invention.

Referring now to FIG. 3, additional details on the feature module 106 are shown. The feature module 106 takes the output from log pattern learning 104 and generates predictive features that can characterize the underlying dynamics of a system. Once the input logs 102 are parsed with the extracted patterns 208, each log (except for outliers) is mapped into one pattern. Thus, instead of having a collection of text logs from a time period [t, t+Δt], a collection of patterns is extracted and the frequency $p_i$ of each pattern i is counted. The present embodiments employ two types of features: a pattern distribution, where each element $X_{t,j}$ in the feature vector $X_t$ is the fraction of a pattern i in the collection; and an adapted TF-IDF feature, where each pattern is an analogy to a word and the time period [t, t+Δt] is regarded as a document.

Block 302 performs log time stamp extraction for each parsed log. Because console logs come from many different sources and may include different time stamp formats, the present embodiments standardize the time stamp formats. One exemplary format that may be used is: YYYY/MM/DD HH:MM:SS, where YYYY represents the year, MM represents the month, DD represents the day, HH represents the hour, MM represents the minute, and SS represents the second. The log time stamp extraction 302 extracts time stamps directly from the output of log pattern learning 104. If there are multiple timestamps within a given input log 102, the maximum timestamp (e.g., the latest in time) will be used to represent the log.

Block 304 generates log time series. Based on each log's represented time stamp, the present embodiments generate time series corresponding to each pattern. The logs are discretized by a specific bin size, where the sparsity (e.g., the percentage of bins having no logs) may be kept at less than about 1%. The time granularity should be kept small to make fine-grained predictions. In one example, the time-series of pattern distributions with a ten minute resolution may have a sparsity of about 0.82%. Each time series includes histograms of each pattern over time. The higher the time series value is at a particular time stamp, the more logs correspond to the pattern at that time. Therefore the log time series captures all the dynamics of the system.

Block 306 extracts pattern distribution features as the relative distribution of each pattern in the overall logs for each time period [t, t+Δt]. Because each log pattern originated from different places in applications' source codes, the patterns provide userful information regarding the dynamics of the system for failure prediction. The pattern distribution feature may be generated in a multi-dimensional vector format. The number of dimensions equals the number of distinct patterns. Each element of the vector may be normalized so that the sum is equal to 1.

Block 308 performs a second type of feature extraction as TF-IDF. Each pattern is treated as a word and all logs occurring in each time period are treated as a single document. TF-IDF feature extraction 308 computes, for each pattern i, TF-IDF=$P_i$ $IDF_i$, where $P_i$ is the frequency of pattern i in the overall logs and $IDF_i$ is the inverse document frequency for the pattern i, defined as the log of the total number of time periods divided by the number of time periods with the pattern i in it. The TF-IDF feature vector will have the same dimensionality as the pattern distribution feature vector produced by block 306, such that the two vectors can be combined into one and provided as an input to failure prediction 108.

Figure 4:
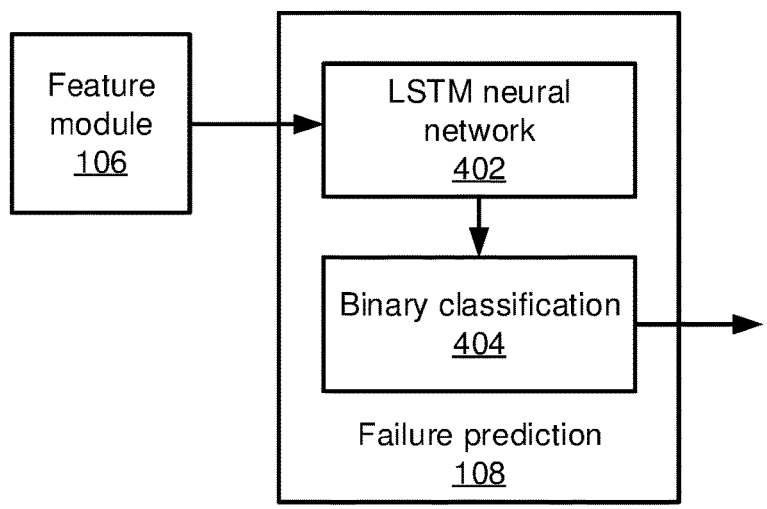
FIG. 4 is a block/flow diagram of failure prediction in accordance with an embodiment of the present invention.

Referring now to FIG. 4, additional details on failure prediction 108 are shown. Failure prediction 108 takes the output from the feature module 106 and generates results that predict the failure status of a system. An LSTM recurrent neural network 402 is a neural network designed to be better at storing and accessing historical information than classical recurrent neural networks.

The architecture of the LSTM recurrent neural network 402 will be described in greater detail below. The same architecture is used in the neural network 402 for dynamic system learning and prediction. In the learning stage, internal parameters of the neural network 402 are learned based on, e.g., back propagation through time. The input includes log features from training data and user labels on failure time periods. In the prediction stage, the neural network 402 takes log features from operational data as input and uses the output of the binary classifier 404 for failure prediction.

The present embodiments provide the probability of a system failure based on the input sequence of historical feature vectors extracted from the logs 102. If such a probability exceeds a pre-defined threshold, an early warning is reported to signal the potential system failure. An early warning signal may be very weak and thus difficult to capture by naïve models. The binary classification 404 makes use of a binary target vector d with two complementary classes. The output of the neural network 402 (expressed herein as $y_t$) is essentially a binary vector serving as a representation of the system status, which can be used to estimate the binomial distribution $Pr(d_t|y_t)$. This distribution can be characterized by a softmax function at the outer layer:

$$Pr(d_t = k \mid y_t) = \hat{y}_t^k = \frac{\exp(y_t^k)}{\sum_{k'=1}^{K} \exp(y_t^{k'})}$$

where k=2 is the number of classes. For the objective function, the binary cross-entropy cost function is used based on the output at a time step t for one training example:

$$C = -\sum_{k=1}^{K} \left[ d_t^k \log(\hat{y}_t^k) + (1 - d_t^k) \log(\hat{y}_t^k) \right]$$

where the target $d_t^k$ is either one or zero.

For the size of the neural network 402, the input size depends on the input feature dimension and output size is just 2 as a result of being a binary classification task. The layer and the number of hidden units determine the width and depth of the network. The more layers and the larger the number of hidden units, the more complex the network becomes to train.

Figure 5:
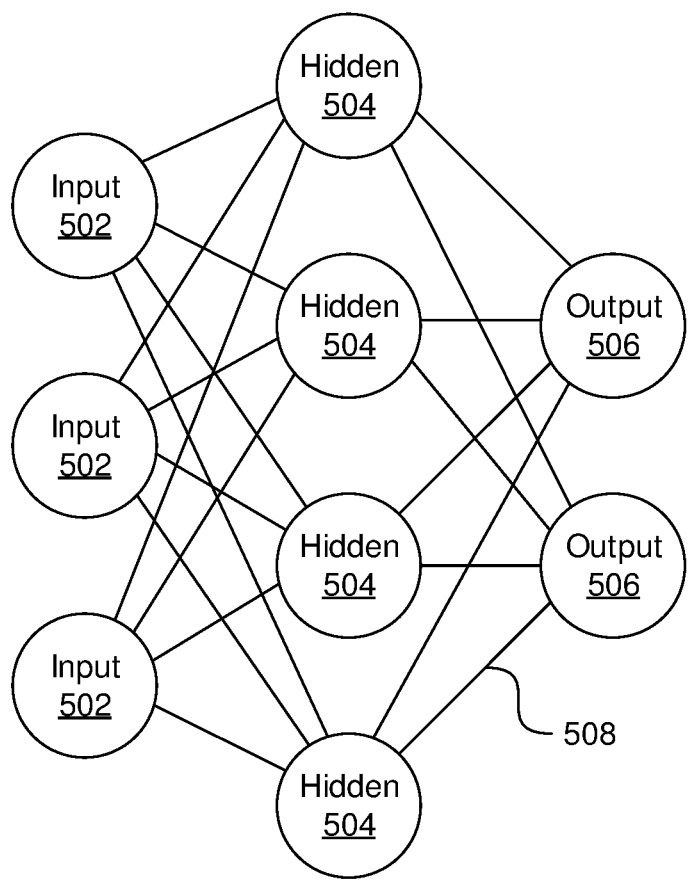
FIG. 5 is a diagram of a neural network in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There may be any number of layers of hidden neurons 504, and as well as neurons that perform different functions. There exist different neural network structures as well, such as convolutional neural network, maxout network, etc. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

Figure 6:
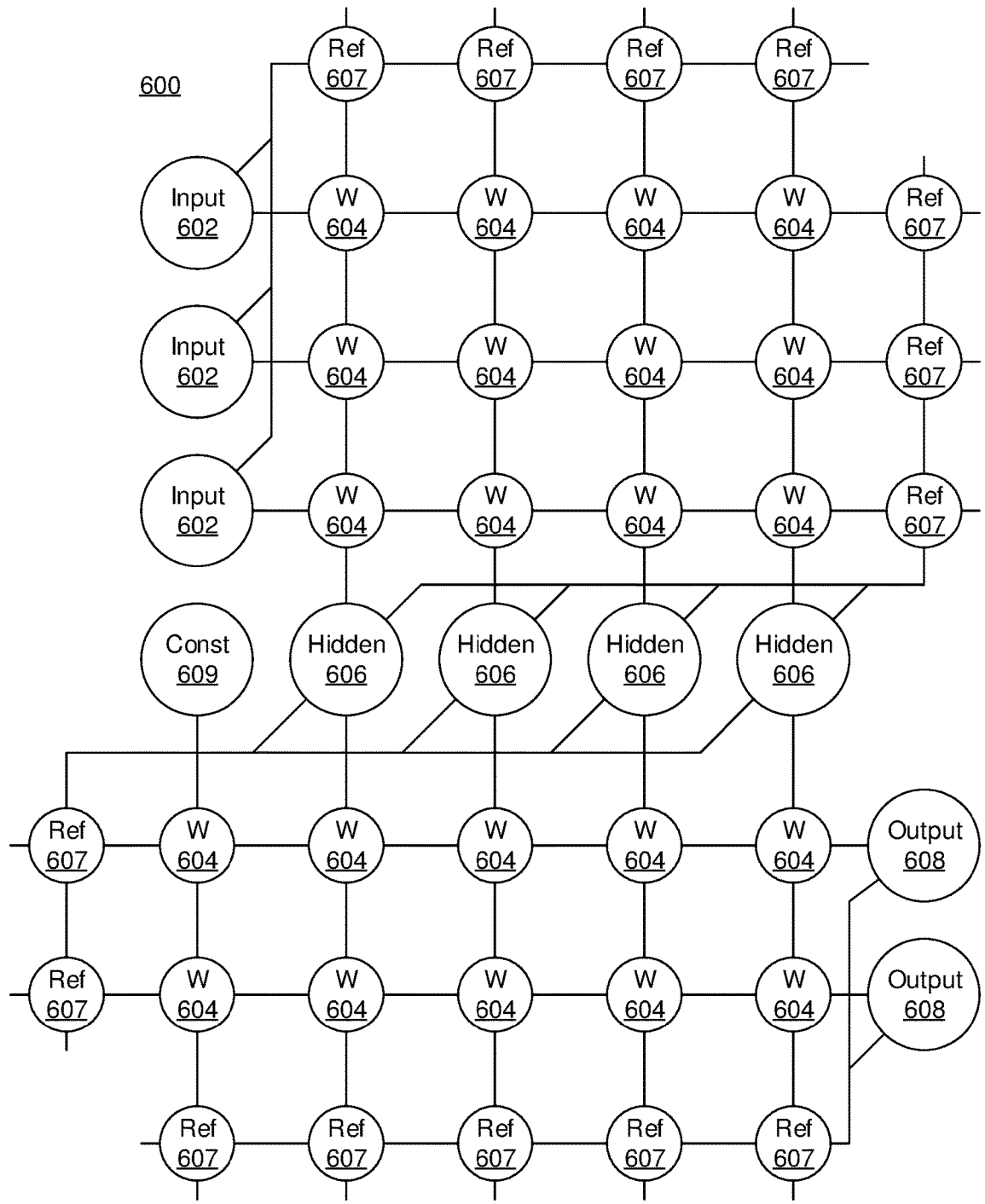
FIG. 6 is a diagram of a neural network in accordance with an embodiment of the present invention.

Referring now to FIG. 6, an artificial neural network (ANN) architecture 600 is shown. It should be understood that the present architecture is purely exemplary and that other architectures or types of neural network may be used instead. During feed-forward operation, a set of input neurons 602 each provide an input voltage in parallel to a respective row of weights 604. The weights 604 each have a settable resistance value, such that a current output flows from the weight 604 to a respective hidden neuron 606 to represent the weighted input. The current output by a given weight is determined as I=v/r, where V is the input voltage from the input neuron 602 and r is the set resistance of the weight 604. The current from each weight adds column-wise and flows to a hidden neuron 606. A set of reference weights 607 have a fixed resistance and combine their outputs into a reference current that is provided to each of the hidden neurons 606. Because conductance values can only be positive numbers, some reference conductance is needed to encode both positive and negative values in the matrix. The currents produced by the weights 604 are continuously valued and positive, and therefore the reference weights 607 are used to provide a reference current, above which currents are considered to have positive values and below which currents are considered to have negative values.

As an alternative to using the reference weights 607, another embodiment may use separate arrays of weights 604 to capture negative values. Each approach has advantages and disadvantages. Using the reference weights 607 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 604 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 606 use the currents from the array of weights 604 and the reference weights 607 to perform some calculation. The hidden neurons 606 then output a voltage of their own to another array of weights 607. This array performs in the same way, with a column of weights 604 receiving a voltage from their respective hidden neuron 606 to produce a weighted current output that adds row-wise and is provided to the output neuron 608.

It should be understood that any number of these stages may be implemented, by interposing additional layers of arrays and hidden neurons 606. It should also be noted that some neurons may be constant neurons 609, which provide a constant voltage to the array. The constant neurons 609 can be present among the input neurons 602 and/or hidden neurons 606 and are only used during feed-forward operation.

During back propagation, the output neurons 608 provide a voltage back across the array of weights 604. The output layer compares the generated network response to training data and computes an error. The error is applied to the array as a voltage pulse, where the height and/or duration of the pulse is modulated proportional to the error value. In this example, a row of weights 604 receives a voltage from a respective output neuron 608 in parallel and converts that voltage into a current which adds column-wise to provide an input to hidden neurons 606. The hidden neurons 606 provide combine the weighted feedback signal with a derivative of its feed-forward calculation and stores an error value before outputting a feedback signal voltage to its respective column of weights 604. This back propagation travels through the entire network 600 until all hidden neurons 606 and the input neurons 602 have stored an error value.

During weight updates, the input neurons 602 and hidden neurons 606 apply a first weight update voltage forward and the output neurons 608 and hidden neurons 606 apply a second weight update voltage backward through the network 600. The combinations of these voltages create a state change within each weight 604, causing the weight 604 to take on a new resistance value. In this manner the weights 604 can be trained to adapt the neural network 600 to errors in its processing. It should be noted that the three modes of operation, feed forward, back propagation, and weight update, do not overlap with one another.

Figure 7:
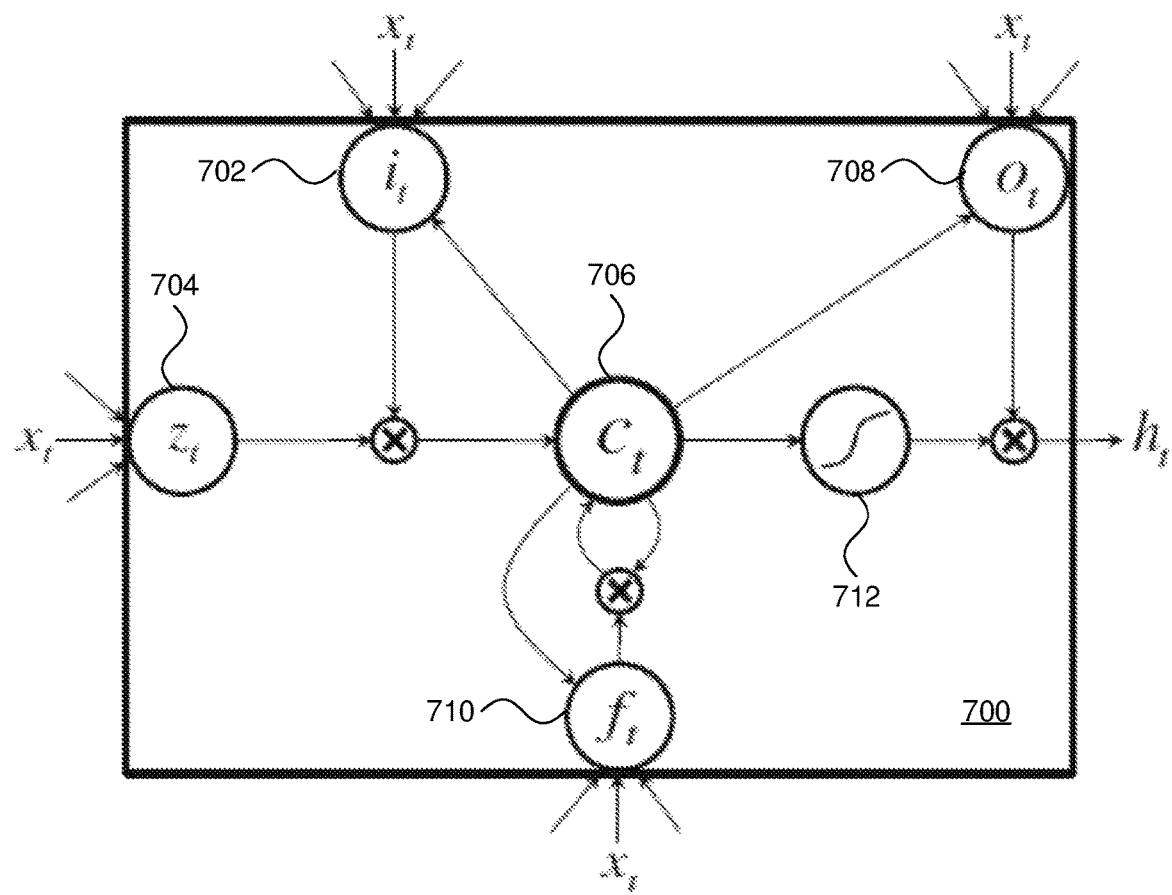
FIG. 7 is a diagram of a long short-term memory cell in accordance with an embodiment of the present invention.

Referring now to FIG. 7, an alternative view of an LSTM memory cell 700 is shown. The memory cell 700 takes as input a vector x which represents the input feature vector sequence $x=(x_{t-L+1}, \ldots, x_t)$ with a sequence length of $L^2$. The input vector x is passed to a stack of multiple recurrently connected hidden layers through weighted connections to compute hidden vector sequences $h=(h_{t-L+1}, \ldots, h_t)$ and, finally, an output vector sequence $y=(y_{t-L+1}, \ldots, y_t)$. The output vector $y_t$ can be used to parameterize the probability distribution $Pr(d_t|y_t)$ of the target $d_t$.

In particular, the memory cell includes an input gate 702, a hidden gate 704, an output gate 708, and a forget gate 710, each of which is associated with a different function over the weights 604 of the neural network 600. Each gate accepts the input vector x and performs a respective calculation on said input as defined below, with the input gate 702 calculating $i_t$, the hidden gate 704 calculating $z_t$, the output gate 708 calculating $o_t$, and the forget gate calculating $f_t$. A cell 706 performs a further calculation to generate $c_t$. An arctan function 712 operates on the output of the cell 706. These calculations are set forth below as:

$$\begin{cases} i_t = \sigma(W_{xi}x_t + W_{hi}h_{t-1} + W_{ci}c_{t-1} + b_i) \\ o_t = \sigma(W_{xo}x_t + W_{ho}h_{t-1} + W_{co}c_{t-1} + b_o) \\ f_t = \sigma(W_{xf}x_t + W_{hf}h_{t-1} + W_{cf}c_{t-1} + b_f) \\ \quad z_t = W_{xc}x_t + W_{cf}h_{t-1} + b_c \\ \quad c_t = f_t c_{t-1} + i_t \tanh(z_t) \\ \quad h_t = o_t \tanh(c_t) \end{cases}$$

where σ is the logistic sigmoid function, b* are the bias terms, and i, f, o, and c are the input gate, forget gate, output gate, and cell vectors respectively, all of which have the same size as the hidden state vector h. The weight matrix W indicates the connections between gates, the cell, input and hidden states. For instance, $W_{hi}$ is the hidden-input gate matrix, while $W_{xf}$ is the input-forget gate matrix. The weight matrices from the cell to gate vectors (e.g., $W_{ci}$) are diagonal, so the $m^{th}$ element in each gate vector only receives input from the $m^{th}$ of the cell vector.

Figure 8:
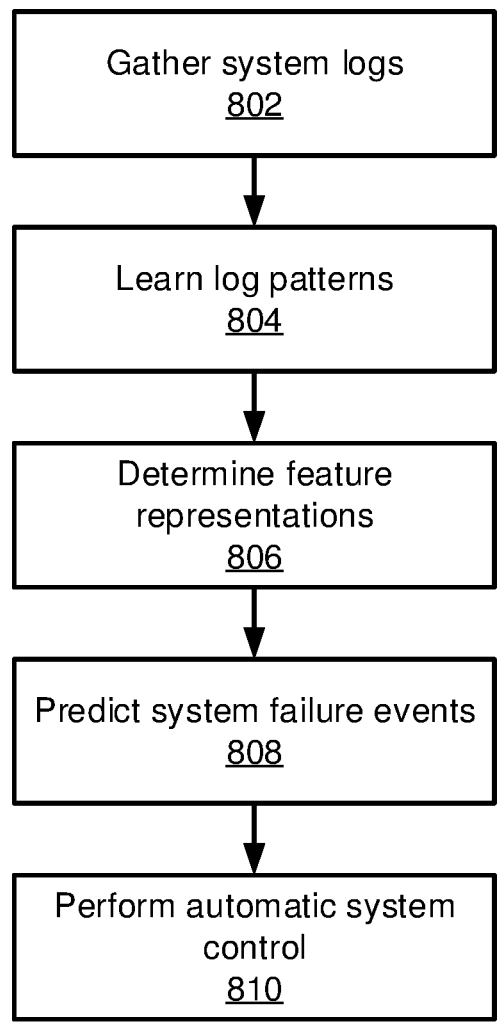
FIG. 8 is a block/flow diagram of a method of system failure prediction and automated system control in accordance with an embodiment of the present invention.

Referring now to FIG. 8, a method of system failure prediction is shown. Block 802 gathers the heterogeneous system logs 102 from any number of different system applications and services. As noted above, the system logs 102 may be in any format and may, therefore, be very different from one another in how they store relevant system information. To accommodate these different log formats, block 804 learns log patterns. As described above, it is specifically contemplated that block 804 may employ hierarchical clustering to group the log records into clusters of similar structure.

Once the logs are clustered, block 806 determines feature representations of the logs. Block 806 recognizes patterns within the logs and generates, e.g., two distinct features to represent the log information: TF-IDF features and a pattern distribution. Based on these features, the LSTM recurrent neural network 402 and binary classifier 404 are used to predict system failures in block 808.

Block 810 performs automatic system control actions based on the predicted system failures. These automatic controls can include any of a variety of actions, ranging from issuing an alert to a human system operator to adjusting the operation of hardware and software systems to prevent or mitigate the system failure.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
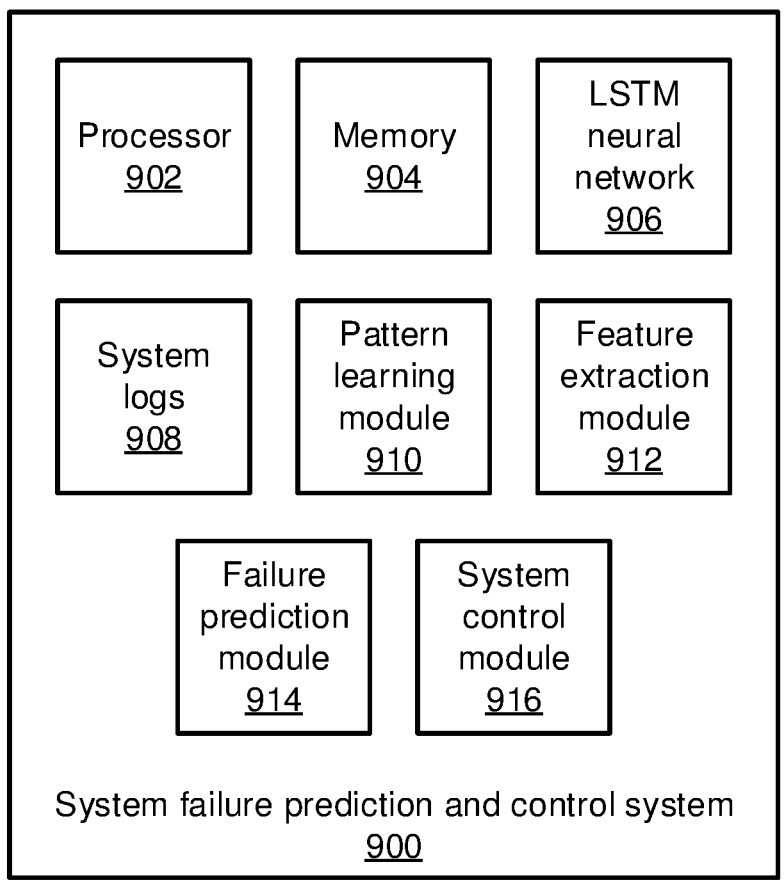
FIG. 9 is a block diagram of a system failure prediction and control system in accordance with an embodiment of the present invention.

Referring now to FIG. 9, a system failure prediction and control system 900 is shown. The system 900 includes a hardware processor and memory 904. The system 900 further includes an LSTM neural network 906 that may be implemented in software or that may, alternatively, be implemented using hardware devices that implement the neurons and weights. System logs 908 are stored in the memory 904 and may be collected from any appropriate source application or system. In addition, the system 900 includes one or more functional modules. In some embodiments, the functional modules may be implemented as software that is stored in memory 904 and that is executed by processor 902. In other embodiments, the functional modules may be implemented as one or more discrete hardware components using, e.g., application-specific integrated chips or field programmable gate arrays.

For example, a pattern learning module uses clustering to group the heterogeneous system logs 908 into clusters having similar structures. A feature extraction module 912 uses the clustered log information to extract a limited number of features that failure prediction module 914 uses to determine whether a system failure may occur in one or more applications or systems. The failure prediction module 914 employs the LSTM neural network to determine whether the information provided by the system logs, characterized by the extracted features, provides an indication of a system failure.

A system control module 916 performs actions based on the prediction generated by failure prediction module. If a failure is predicted, the system control module 916 may, for example, issue an alert to a system operator or may directly perform an action to mitigate or prevent the system failure. Such automatic actions may include, for example, system load balancing, cooling/environmental control, network control actions (e.g., rerouting traffic or blocking a particular connection or data stream), and system shut down.

Figure 10:
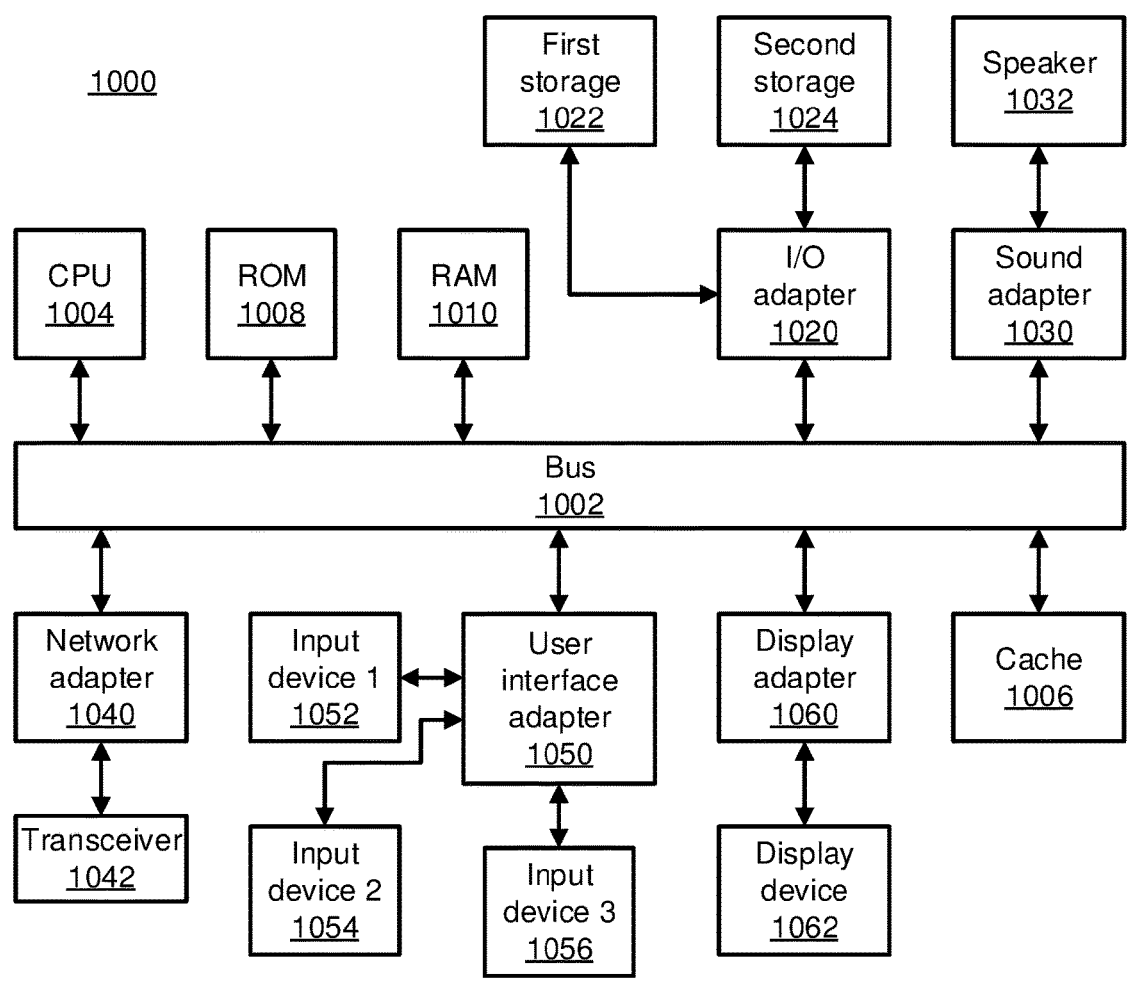
FIG. 10 is a block diagram of a processing system in accordance with an embodiment of the present invention.

Referring now to FIG. 10, an exemplary processing system 1000 is shown which may represent the system failure prediction and control system 900. The processing system 1000 includes at least one processor (CPU) 1004 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and a display adapter 1060, are operatively coupled to the system bus 1002.

A first storage device 1022 and a second storage device 1024 are operatively coupled to system bus 1002 by the I/O adapter 1020. The storage devices 1022 and 1024 can be any of a disk storage device (e.g., a magnetic or optical disk storage device), a solid state magnetic device, and so forth. The storage devices 1022 and 1024 can be the same type of storage device or different types of storage devices.

A speaker 1032 is operatively coupled to system bus 1002 by the sound adapter 1030. A transceiver 1042 is operatively coupled to system bus 1002 by network adapter 1040. A display device 1062 is operatively coupled to system bus 1002 by display adapter 1060.

A first user input device 1052, a second user input device 1054, and a third user input device 1056 are operatively coupled to system bus 1002 by user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 are used to input and output information to and from system 1000.

Of course, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Figure 11:
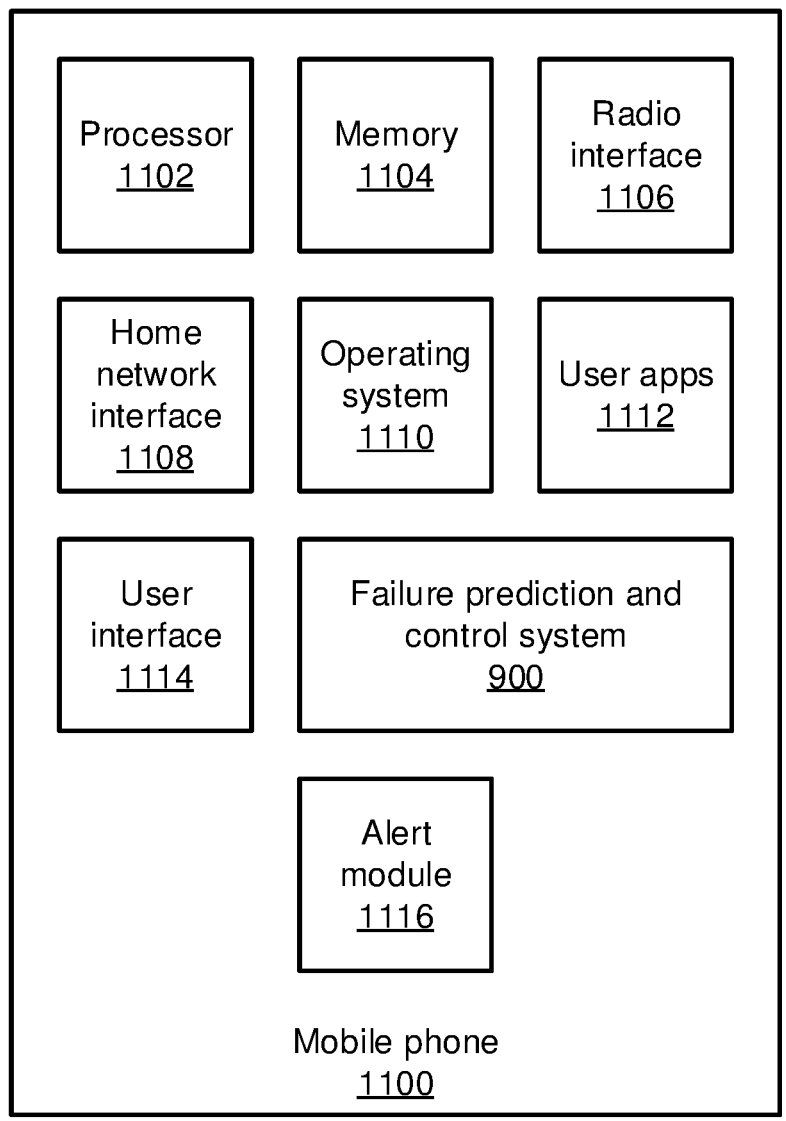
FIG. 11 is a block diagram of a mobile phone device having a failure prediction and control system in accordance with an embodiment of the present invention.

Referring now to FIG. 11, a mobile phone device 1100 is shown. It should be understood that the present embodiments may be implemented in any appropriate end-user product—the mobile phone device 1100 is used solely to illustrate one application and should not be construed as limiting.

The mobile phone device 1100 includes a processor 1102 and a memory 1104. A radio interface 1106 provides communications with a mobile telephony network and may operate on any appropriate wireless communications standard. A distinct network interface adapter 1108 provides communications with a user's home network by any appropriate wireless communications standard such as, e.g., WIFI.

An operating system 1110 runs on the mobile phone device 1100 and provides a functional interface between the processor 1102, memory 1104, and one or more user applications 1112. A user interface 1114 provides a graphical and/or textual display that provides a user with information and that accepts inputs from the user. In particular, an alert module 1116 interfaces with the user interface 1114 to provide information to a user or service provider regarding the status of the components. The alert module 1116 may provide a visual indicator, for example by an icon or light source, a textual indicator, for example a notification or email, or an auditory indicator, for example a chime or other sound.

All of these different components may have respective detectors that gather data regarding their respective components and store the data as logs. As noted in detail above, the logs may have different formats, but the failure prediction and control system finds patterns within the logs, derives a set of representative features, and predicts failures for components within the mobile device 1100. Any user-installed application 1112 may contribute such logs, and the failure prediction and control system 900 can thereby provide adaptive system monitoring for comprehensive failure prediction by determining a likelihood of failure for each component.

The failure prediction and control system 900 can furthermore take actions to ameliorate or prevent such predicted failures. These actions may include, for example, turning off one or more components, decreasing processor performance to lower temperature or extend battery life, and managing app permissions if a user application 1112 is consuming too many system resources. The failure prediction and control system 900 may take action if the likelihood of failure exceeds an automatic control threshold.

The alert module 1116 can provide information to a user or service provider regarding the prediction. In one example, if the failure prediction and control system 900 predicts the failure of one or more components, the alert module 1116 can provide information to the user about the potential failure. In another embodiment, the alert module 1116 can provide information to a service provider or manager, for example in the case where the mobile phone device 1100 is deployed to employees. In this case, the manager can then proactively repair or replace the mobile phone device 1100. The alert module 1116 may generate an alert if the likelihood of a failure exceeds an alert threshold. This threshold may be set at a lower likelihood than a threshold used to automatically control the system.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for mobile phone failure prediction, comprising:
   receiving respective log files from one or more mobile phone components, including at least one user application, wherein the log files have heterogeneous formats;
   training a long short-term memory recurrent neural network from training data and user labels on failure time periods;
   determining a likelihood of a failure of one or more mobile phone components based on the received log files by clustering the log files according to structural log patterns to form log clusters and determining feature representations of the log files based on the log clusters by processing the feature representations using the long short-term memory recurrent neural network;
   alerting a user to a potential failure if the likelihood of the failure exceeds a first threshold; and
   performing an automatic system control action if the likelihood of the failure exceeds a second threshold.

2. The method of claim 1, wherein determining the feature representations comprises determining two, and only two, feature representations.

3. The method of claim 2, wherein the two feature representations consist of pattern distribution among clustered logs and term frequency inverse document frequency.

4. The method of claim 1, wherein clustering the plurality of log files comprises performing unsupervised, hierarchical clustering.

5. The method of claim 1, wherein determining the likelihood of the failure of one or more of the mobile phone components comprises determining a binomial distribution based on an output of the neural network and a binary target vector with two complementary classes.

6. The method of claim 1, wherein the heterogeneous log formats comprise different delimiter formats.

7. A method for mobile phone failure prediction, comprising:
   clustering a plurality of log files from respective mobile phone components, including at least one user application, having heterogeneous log formats according to structural log patterns using unsupervised, hierarchical clustering to form log clusters;
   determining feature representations of the log files based on the log clusters, wherein the feature representations consist of pattern distribution among clustered logs and term frequency—inverse document frequency;
   training a long short-term memory recurrent neural network from training data and user labels on failure time periods;
   determining a likelihood of a failure of one or more of the mobile phone components based on the feature representations using the long short-term memory neural network, a binomial distribution based on an output of the long short-term memory neural network, and a binary target vector with two complementary classes by processing the feature representations using the long short-term memory recurrent neural network;
   alerting a user to a potential failure if the likelihood of the failure exceeds a first threshold; and
   performing an automatic system control action if the likelihood of the failure exceeds a second threshold.

8. A mobile phone, comprising:
   a processor;
   a memory configured to store respective log files from one or more mobile phone components, including at least one user application, wherein the log files have heterogeneous formats;
   a long-short term memory recurrent neural network that is trained from training data and user labels on failure time periods;
   a pattern learning module configured to use the processor to cluster the log files according to structural log patterns to form log clusters;
   a feature extraction module configured to determine feature representations of the log files based on the log clusters;
   a failure prediction module configured to determine a likelihood of a failure of one or more of the mobile phone components based on the feature representations by processing the feature representations using the long short-term memory recurrent neural network;
   an alert module configured to alert a user to a potential failure if the likelihood of the failure exceeds a first threshold; and
   a system control module configured to perform an automatic system control action if the likelihood of the failure exceeds a second threshold.

9. The system of claim 8, wherein the feature extraction module is further configured to determine two, and only two, feature representations.

10. The system of claim 9, wherein the two feature representations consist of pattern distribution among clustered logs and term frequency inverse document frequency.

11. The system of claim 8, wherein the pattern learning module is further configured to perform unsupervised, hierarchical clustering.

12. The system of claim 8, wherein the failure prediction module is further configured to determine a binomial distribution based on an output of the neural network and a binary target vector with two complementary classes.

13. The system of claim 8, wherein the log files comprise a plurality of different log formats.

14. The system of claim 13, wherein the heterogeneous log formats comprise different delimiter formats.

* * * * *